A. REDLER.
MEANS FOR ABSTRACTING PULVERULENT MATERIAL FROM BULK.
APPLICATION FILED JULY 8, 1920.
1,416,416.
Patented May 16, 1922.
6 SHEETS—SHEET 1.
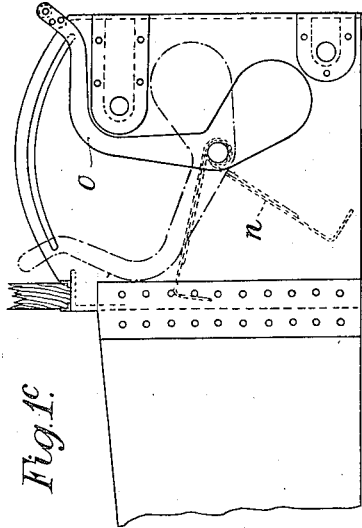
Fig.1c.
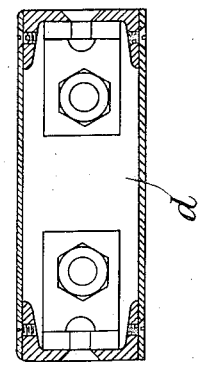
Fig.1b.
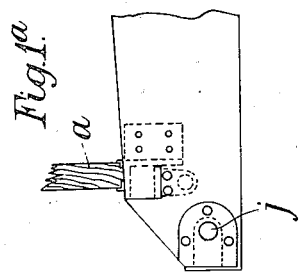
Fig.1a.
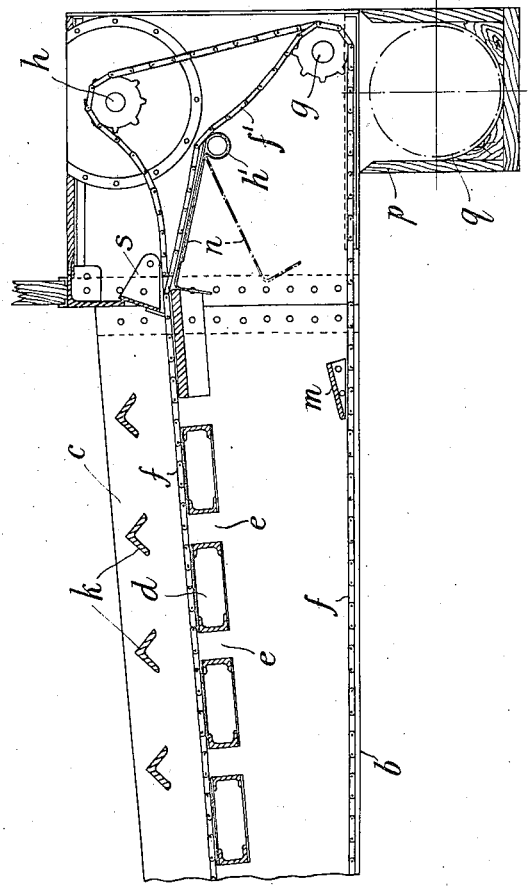
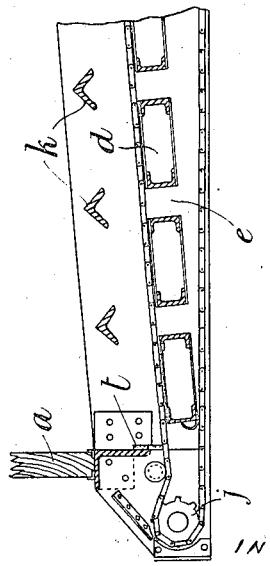
Fig.1.
INVENTOR:
Arnold Redler
By Wm Wallace White
ATTY.

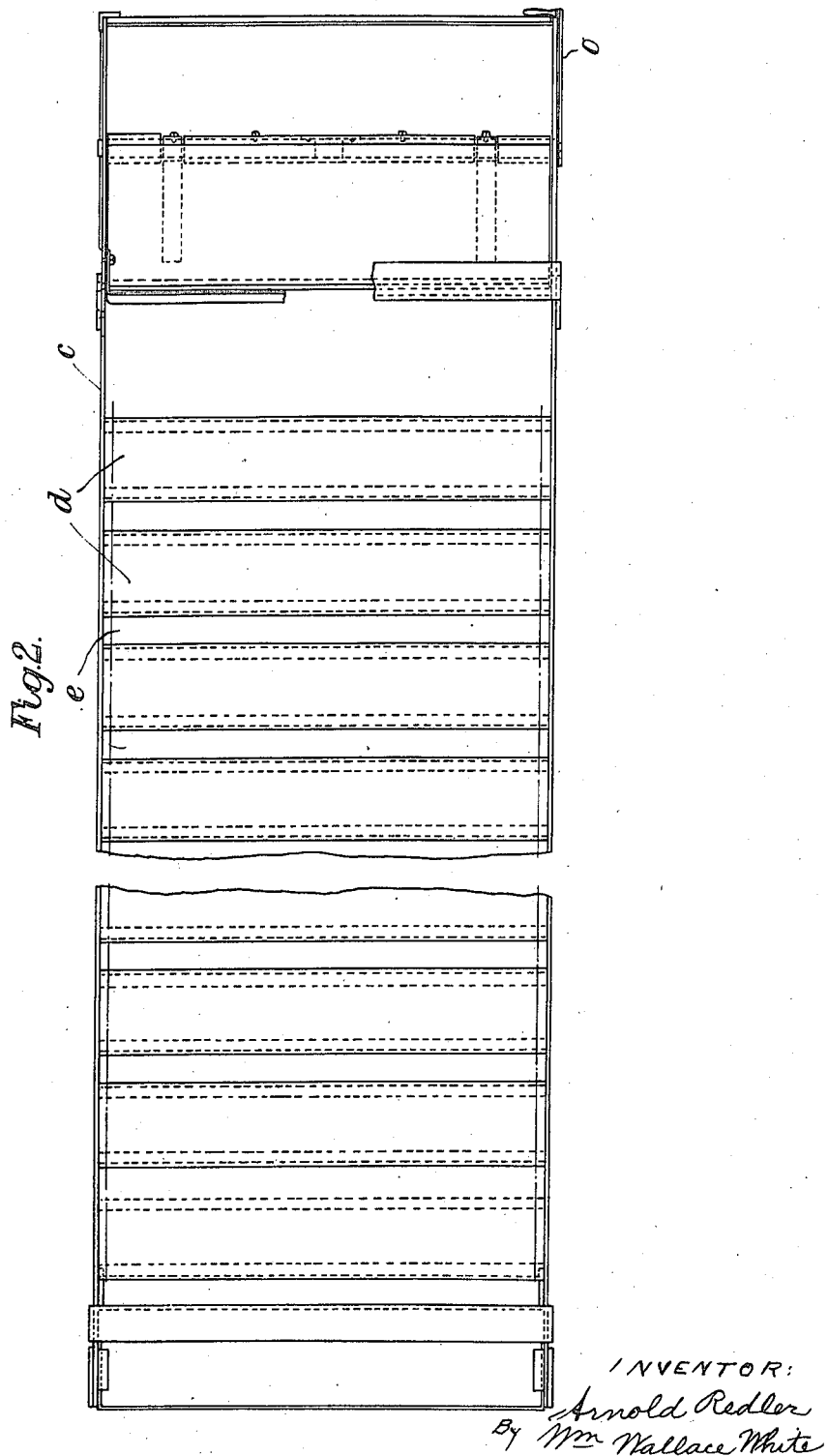

A. REDLER.
MEANS FOR ABSTRACTING PULVERULENT MATERIAL FROM BULK.
APPLICATION FILED JULY 8, 1920.
1,416,416. Patented May 16, 1922.
6 SHEETS—SHEET 3.
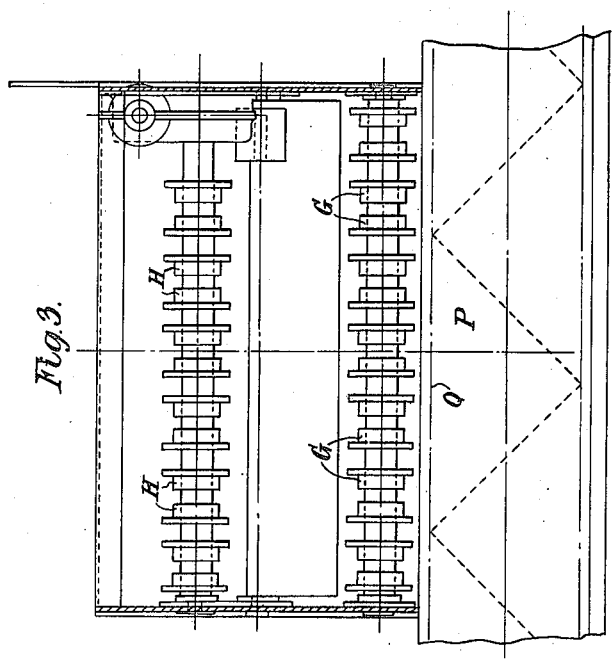
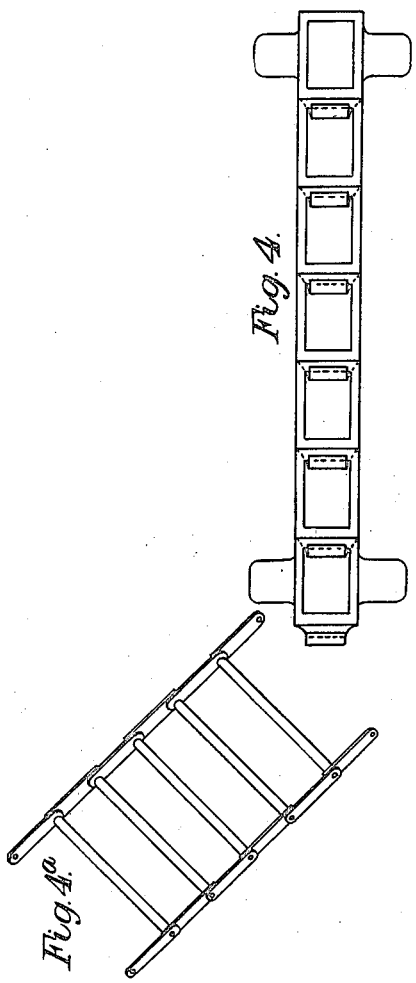
INVENTOR:
Arnold Redler
By Wm Wallace White
ATTY.

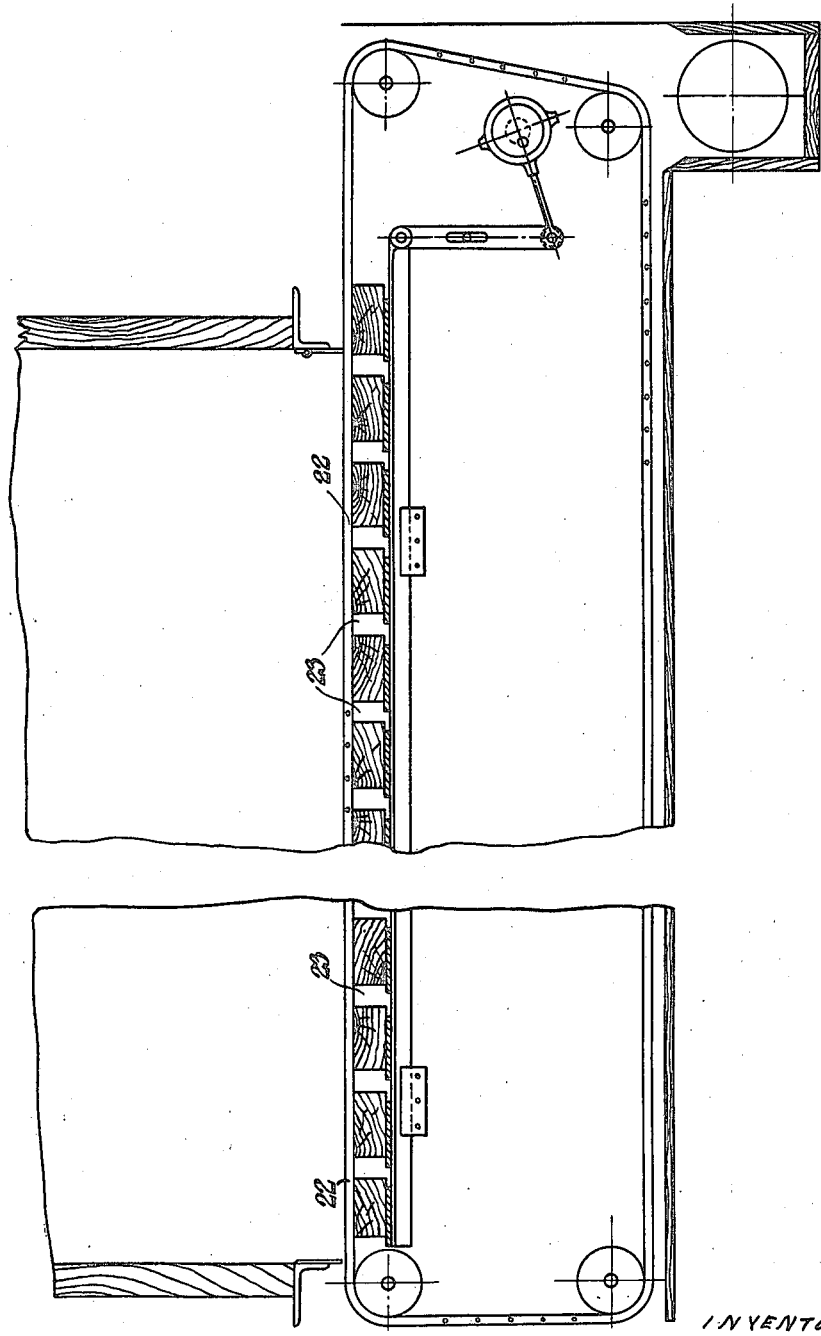

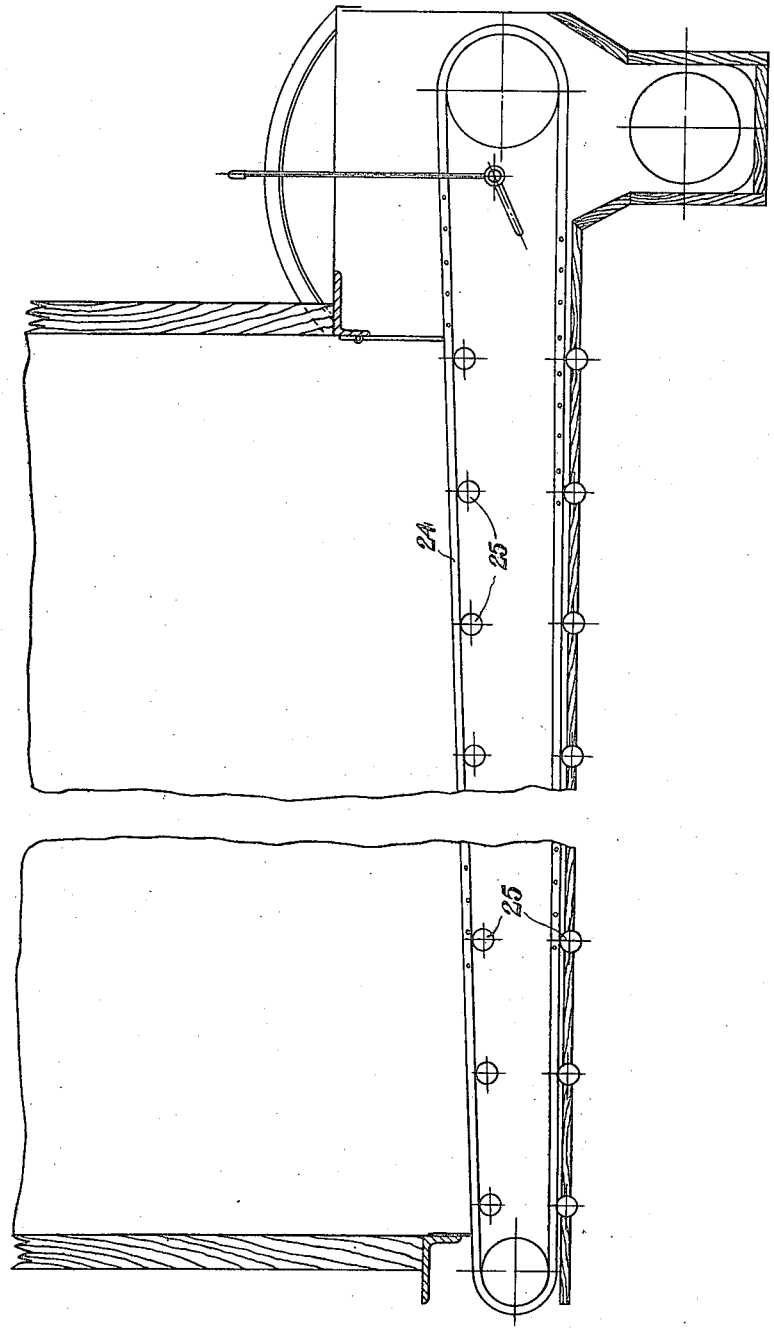

A. REDLER.
MEANS FOR ABSTRACTING PULVERULENT MATERIAL FROM BULK.
APPLICATION FILED JULY 8, 1920.

1,416,416.

Patented May 16, 1922.
6 SHEETS—SHEET 6.

INVENTOR:
Arnold Redler
By Wm. Wallace White
ATTY.

UNITED STATES PATENT OFFICE.

ARNOLD REDLER, OF FLOUR MILLS, SHARPNESS, ENGLAND.

MEANS FOR ABSTRACTING PULVERULENT MATERIAL FROM BULK.

1,416,416. Specification of Letters Patent. Patented May 16, 1922.

Application filed July 8, 1920. Serial No. 394,716.

*To all whom it may concern:*

Be it known that I, ARNOLD REDLER, of Flour Mills, Sharpness, in the county of Gloucester, England, a subject of the King of Great Britain and Ireland, have invented certain new and useful Means for Abstracting Pulverulent Material from Bulk, of which the following is a specification.

This invention has reference to methods of and means for abstracting and delivering flour and other substances in a granular flocculent or fine state of division from the bottom of a bin in which it is stored in bulk.

With flour or other substances of a like nature it is found that binding or consolidation of the mass takes place and in consequence it can only be got out with great difficulty and I have found that when stored in large bins in bulk it is always liable to core and to discharge with intermittent avalanches, and parts of the bulk are liable to be held up indefinitely in the bin or holder especially if the bin is replenished from time to time before being emptied.

The object of this invention is to provide an improved method and means for abstracting and ensuring a continuous delivery of substances from a bin or holder in which the substance is stored in bulk.

By the term bin, I mean a single receptacle, chamber or cell and when a silo or the like is divided into cells or formed of a plurality of chambers each cell or chamber constitutes a bin according to this definition and one object of this invention is to avoid the necessity of cellular structures for holding and discharging flour or other substances in a fine state of division.

From experiments which I have made with flour I have found that, to obtain the best results and prevent coring and avalanching, the flour at the bottom of the bulk should be separated from the bulk more or less uniformly from the whole area of the bottom of the bulk, and that the portions so separated should be relieved of any pressure due to the weight of the substance in the bin and that the rate of abstraction and discharge and delivery should be under control and that when the regulator is set, the rate of abstraction and discharge should remain constant regardless of the variable heights of flour in the bin.

I have also found that the fixed means such as hopper sides hitherto employed for supporting the flour either alone or in combination with moving means are too large and produce coring or avalanching, and no bin has been hitherto constructed solely with a plurality of detaching devices supported on a plurality of bearing surfaces within the bin above or on the floor of the bin with means for preventing coring and avalanching, and further, where detaching devices have been hitherto employed they have sometimes caused excessive attrition due to rapid revolution of the parts altering the condition of the contents on being discharged and in some cases damaging it, and in other cases such devices involve waste energy besides injury to the flour by certain of the revolving members working in flour which has no immediate exit or freedom of motion.

According to this invention the flour is detached from the bulk by chain-like elements at a plurality of points or parts of a surface or surfaces of abstraction hereinafter referred to as points of abstraction which are sufficiently close together to prevent coring or avalanching and from which points or surface it is moved simultaneously and delivered in a loose condition into a receptacle, hopper, or portion of the bin below said points or surface of abstraction, and through which receptacle, hopper or portion of the bin it is moved continuously, said detaching device or devices supporting the flour with or without live lands, and itself being supported on a plurality of bearing surfaces within the bin and in or above the floor of the bin or in or above the discharge receptacle or hopper, and for this purpose the bin or holder is or may be provided with one or more abstracting and discharging devices, each having one or more moving members comprising chain like elements adapted to break up or disturb the flour at the bottom of the bulk, and with or without live lands (i. e. supporting surfaces adapted to be moved for that portion of the bulk above them) arranged and disposed to allow the bulk to gravitate continuously without coring and avalanching.

In carrying out this invention the bin discharger or abstracting device placed within the bin is provided a plurality of points of abstraction at the bottom of the bulk, preferably uniformly distributed and is provided also with one or more moving members which form a detaching device; said means permitting the bulk to gravitate continuously without coring or avalanching and means are provided for conveying the detached portions away from the bin. In addition to chain-like detaching devices, suitable live or fixed lands are provided to help support the weight of the bulk and where used they are preferably narrow.

The detaching devices alone or with the live lands support the flour so that the separated portions are relieved of any pressure due to the weight of the substance in the bin, the detaching device being supported by a false bottom which term includes supporting rollers or the bottom itself when a receptacle is placed below the bottom. The false bottom where employed may be flat but is preferably inclined.

The detaching devices are moved at the bottom of the bulk of flour or other substance and they may extend through openings in the walls of the bin or receptacle. Such detaching devices consist of one or more chain like members, the movement of which breaks up, disturbs or disintegrates the undersurface of the bulk and prevents it consolidating or binding together, at the same time detaching portions from the bulk.

The detached portions are collected, conveyed and delivered from the holder by appropriate means. The under run of such chain-like devices can be arranged to collect and convey the detached portions from the holder as one stream, discharging same into an appropriate receptacle or receptacles, such final discharge being facilitated or ensured if required by means of devices provided with pegs, pins or their equivalent adapted to enter the links or the like and remove the substance therefrom.

The abstracting and discharging device or devices may be integral with the bin or adapted to be attached thereto.

The various parts of an apparatus made in accordance with this invention may be classified as under:

(1) Means for supporting the substance in bulk in the bin or holder.

(2) Means for detaching portions of the bulk.

(3) Means for allowing the detached portions to escape.

(4) Means for collecting the detached portions and discharging.

(5) Means for regulating the rate at which the portions are detached from the bulk.

The substance is supported over the area of the bin by the detaching devices alone or in conjunction with live lands. The live lands may have horizontal surfaces, or surfaces inclined to the horizontal, or they may be shaped with an actute apex, or they may be rotary members having motion or vibration imparted to them by mechanical means, so that the flour passes over them by gravitation to a point of abstraction.

The object of such mechanical movement is to so disturb the bottom of the bulk of flour that portions of the bulk shall be continually moving towards the points of abstraction there to be removed from contact with the bulk.

The detaching devices consist of chain-like members, adapted to be moved with or without teeth or spikes or cutting edge, which disturb the bottom of the bulk in order that the flour shall gravitate away from or be removed from the bulk through the points of abstraction so as to be in a position for collection.

The means for allowing the detached portions to escape comprise apertures or points of abstraction arranged preferably uniformly at the under surface of the bulk in the bottom or edges or sides of the bin or of the false bottom or between the detaching devices or spaces between the lands, the flour being delivered to the apertures or points of abstracting by the detaching devices or live lands or by gravitation.

The means for collecting and discharging the flour from the points of abstraction comprise a receptacle or hopper adapted to receive the flour by gravitation from the exits of the points of abstraction from which the flour can be transported by ordinary methods.

The collection and discharge may be effected by an endless flexible grid or band, or by chains, to a worm or other conveyor at the front. This arrangement of collection and discharge can also be modified to deliver to a hopper or other receptacle by aperturing the floor of the bin or making said floor of grid-like form. Further modifications may be made by dispensing with the false or upper bottom and constructing the floor in the manner of the said false bottom, with or without the detaching devices, to form a bottom through which the flour may pass to the receptacle below.

The means for regulating the rate of abstraction may be by a hand or mechanically operated hit and miss or other regulator of suitable type disposed below the points of abstraction, or the rate may be regulated by a vertical slide or hinged flap or the like adapted to be opened or closed to free or dam back the flour. When the receptacle or the space for the detached portions is of increasing dimensions from back to front the latter operation affects every point of abstraction aproximately to the same extent or proportionately to the capacity of each point of abstraction so that the whole area of the bottom of the bulk is affected simultaneously. The regulating slide or hinged flap is specially adapted for controlling the discharge at the open end of the hopper, receptacle or chamber through which chain-like members are collecting the flour from the various exits or points of abstraction and delivering it through to one discharge.

Where live lands are employed parts of their area according to their position within the bin, may become detaching devices.

In one arrangement in order to assist in the proper discharge and regulation of the flour from the whole area of the bin the plane of the undersurface of the detaching device, live lands or false bottom forms an angle with the plane of the surface supporting the detached portions so that an increasing space from the back to the front or discharging end of bin becomes available for the detached portions. Where the forms or equivalents are fixed diagonally or sides of the forms are out of parallel with the sides of the bin the increasing space may be provided laterally or/and vertically.

Whatever mechanical means are adopted the speed will to a large extent govern the rate of emptying a bin but the rate of abstraction and delivery can be controlled in a wide degree by the regulating flap even whilst the mechanical speed remains constant and such controlling mechanism or device affects each abstraction point to an approximately proportionate extent. The apparatus when driven at a very slow speed will discharge a large volume of flour whilst the power required to operate the apparatus remains exceedingly small. When the regulating flap is set any variation in the rate of discharge due to different heights of flour in the bin, is very slight. Another important advantage of the discharging apparatus constructed in accordance with this invention is that the mechanical devices do not require any space below the floor of the bin, so that the bin can be constructed directly on the ground. It follows that the supporting structure of large size bins is considerably simplified, as the weight may be supported on the ground. A further important feature of this invention is that the described discharging apparatus may be constructed as a distinct self contained unit, and one or more such units of the same or of different type, may be introduced within any existing rectangular bin with very little structural alterations, in fact, by only opening up a few feet of the front and back of the bin.

Referring to the drawings filed herewith:—

Fig. 1 is a longitudinal section of one form of bin discharger made in accordance with this invention;

Figs. 1ª and 1ᵇ show details of construction;

Fig. 1ᶜ shows the details of the regulating device;

Fig. 2 is a plan of the fixed parts of the apparatus shown in Fig 1;

Fig. 3 is a cross section of Fig. 1;

Fig. 4 is a plan of one form of flexible grid adapted for use with discharging apparatus shown in Fig. 1;

Figure 8:
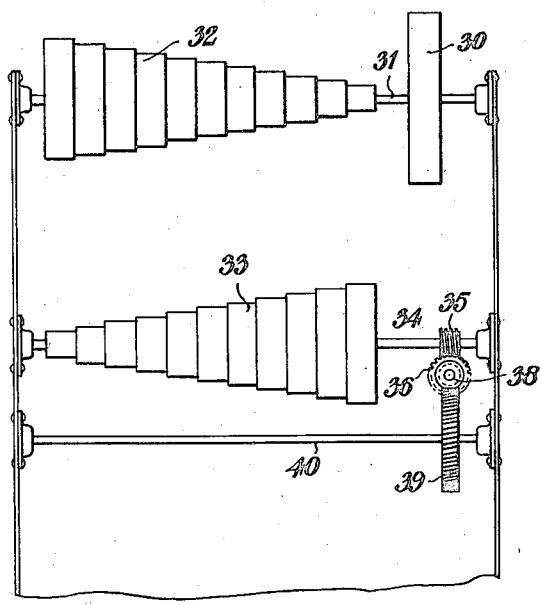
Figure 7:
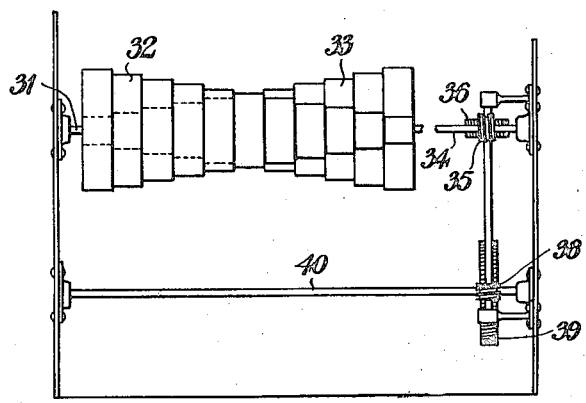

Fig. 4ª is a perspective view of another form of grid;

Figs. 5 and 6 are diagrammatic longitudinal sections of modified constructions;

Fig. 7 is a plan and Fig. 8 a side view showing means for varying the speed of the shaft or shafts which drive the apparatus.

In the constructions shown in the drawings, $a\ a$ are the walls of a bin holder and $b$ the bottom.

Within the bin are disposed two metal plates $c\ c$ to support an inclined false bottom $d$ provided with apertures $e\ e$. On the inclined false bottom $d$ and bottom $b$ is disposed a continuous flexible chain like grid $f$ which may be of any suitable constructions, two such constructions being shown in plan in Figs. 3 and 4. This grid $f$ passes on sprocket wheels $g$ and $h$ and $j$ adapted to be driven in any suitable manner. A portion of the grid $f$ passes over a jockey pulley $h'$ to avoid the gear box $h^2$.

Over the apertures $e\ e$ bars $k$ are or may be placed if desired, with means for moving the bars so that they constitute live lands.

Resting on the travelling grid but held at both sides is a dead plate $m$ and pivoted within the rim of the travelling grid, is a regulating flap $n$, which can be adjusted by a lever $o$.

At the end of the travelling grid is a trough $p$ in which is disposed a flighted worm $q$. A flap $r$ allows access to the bottom of the bin; a stop $s$ stopping the movement of the flap in one direction.

At the lower end of the sloping false bottom is a leather wiper $t$. In use assuming the bin is full of flour on driving the travelling grid flour falls into the cavities of the grid and through the grid at each opening $e$ on to the chain below loosely filling the space between the upper and lower parts of the grid. The wiper $t$ prevents the flour from passing above the grid around the sprocket wheel $j$ the flour within the cavities of the grid passing down on to the lower part of the grid before it reaches the sprocket wheel $j$.

The flour is deposited in strata in the space below the false bottom, the top layer being that which falls through the opening nearest the regulator $n$. As the flour passes over the dead plate $m$ and comes against the regulator $n$ the flour as it passes over the dead plate, falls down and passes through the gap and passes out also so that all the flour at the leading end of the travelling grid passes out before that which is behind. After the flour has passed the regulator $n$ it is carried forward till it drops into the trough $p$ where it is removed by a conveyor. The travelling grid in this form acts both as a detaching device and a conveyor.

In Fig. 5 an endless grid 22 travels over a false bottom provided with apertures 23. The regulation may be effected by varying the speed and extent of the reciprocating movement of a hit and miss regulator, disposed below the apertures, as shown at 24.

In Fig. 6 the upper run of a travelling chainlike member 24 supported by rollers 25 forms the supporting and detaching device. The lower run forms the conveyor.

A discharge regulator may be similar to that shown in Fig. 1.

Figs. 7 and 8 show means for varying the speed of the shaft driving the detaching apparatus, or of the shaft driving the conveyor for the detached portions or of both of these shafts.

The driving pulley is shown at 30 upon the shaft 31 on which is mounted a stepped pulley 32. Beneath or in any other suitable position relative to the stepped pulley 32 an oppositely arranged second stepped pulley 33 is mounted upon a shaft 34 parallel to the shaft 31. In the arrangement shown the shaft 34 carries a worm 35 (Fig. 8) engaging a worm wheel 36 mounted upon a shaft 37 (Fig. 7) at right angles to the shafts 31 and 34 and carrying a worm 38 engaging with a worm wheel 39 mounted upon the shaft 40 of the sprocket wheel driving the detaching grid or other device. It will be seen that a wide range of speed can readily be imparted to the shaft 40 at will by means of the apparatus shown; also that any other suitable change speed device may be employed for the same purpose in place of the apparatus illustrated.

What I claim and desire to secure by Letters Patent is:—

1. In means for abstracting pulverulent material from bulk in a bin a chain disposed over the bottom of the bin adapted to be moved, said bottom being provided with a plurality of apertures, a receptacle below the bin having increasing dimensions towards one end and a discharge orifice at said end.

2. In means for abstracting pulverulent material from bulk in a bin a chain disposed over the bottom of the bin adapted to be moved, said bottom being provided with a plurality of apertures, a receptacle below the bin having increasing dimensions towards one end and a discharge orifice at said end, the middle run of said chain being supported by the bottom of the receptacle.

3. In means for abstracting pulverulent material from bulk in a bin a chain disposed over the bottom of the bin adapted to be moved, said bottom being provided with a plurality of apertures, a receptacle below the bin having increasing dimensions toward one end and a discharge orifice at said end, the middle run of said chain being supported by the bottom of the receptacle, and a regulating flap near the discharge end of said receptacle.

In testimony whereof I have signed my name to this specification.

ARNOLD REDLER.